(12) United States Patent
Wagenleitner

(10) Patent No.: US 10,017,361 B2
(45) Date of Patent: Jul. 10, 2018

(54) HANDRAIL DRIVE FOR AN ESCALATOR OR A MOVING WALKWAY

(71) Applicant: Inventio AG, Hergiswil (CH)

(72) Inventor: Georg Wagenleitner, Vienna (AT)

(73) Assignee: INVENTIO AG, Hergiswil NW (CH)

( * ) Notice: Subject to any disclaimer, the term of this patent is extended or adjusted under 35 U.S.C. 154(b) by 0 days.

(21) Appl. No.: 15/531,497

(22) PCT Filed: Oct. 27, 2015

(86) PCT No.: PCT/EP2015/074827
§ 371 (c)(1),
(2) Date: May 30, 2017

(87) PCT Pub. No.: WO2016/083049
PCT Pub. Date: Jun. 2, 2016

(65) Prior Publication Data
US 2017/0267498 A1    Sep. 21, 2017

(30) Foreign Application Priority Data
Nov. 28, 2014 (EP) ..................................... 14195353

(51) Int. Cl.
*B66B 23/04* (2006.01)
*B65G 23/12* (2006.01)
(Continued)

(52) U.S. Cl.
CPC .............. *B66B 23/04* (2013.01); *B65G 23/12* (2013.01); *B65G 23/14* (2013.01); *B66B 23/24* (2013.01)

(58) Field of Classification Search
CPC ......... B66B 23/04; B66B 23/24; B66B 23/20; B65G 23/14; B65G 23/12
(Continued)

(56) References Cited

U.S. PATENT DOCUMENTS 3,666,075 A * 5/1972 Iwata ...................... B66B 23/04
198/335
3,779,360 A 12/1973 Taher et al.
(Continued)

FOREIGN PATENT DOCUMENTS

CN    101423170 A    5/2009
EP        0385276 A2    9/1990
(Continued)

*Primary Examiner* — Leslie A Nicholson, III
*Assistant Examiner* — Keith R Campbell
(74) *Attorney, Agent, or Firm* — William J. Clemens; Shumaker, Loop & Kendrick, LLP

(57) ABSTRACT

A handrail drive for driving a handrail of a person-transporting device has at least one drive device and at least one counterpressure device. The counterpressure device contains at least one loading device and at least two counterpressure rollers, wherein the handrail can be guided between the drive device and the counterpressure device. The counterpressure rollers load the handrail against the drive device by a pressing force caused by the preloading force of the loading device. At least one flexible pulling element is arranged between the at least one counterpressure roller and the loading device, by which flexible pulling element the preloading force of the loading device can be transferred to the at least one counterpressure roller.

14 Claims, 3 Drawing Sheets

(51) Int. Cl.
*B65G 23/14* (2006.01)
*B66B 23/24* (2006.01)

(58) Field of Classification Search
USPC .................................... 198/330, 335, 336
See application file for complete search history.

(56) References Cited

U.S. PATENT DOCUMENTS

| | | | | |
|---|---|---|---|---|
| 4,589,539 | A * | 5/1986 | Boltrek | B66B 23/04 |
| | | | | 198/331 |
| 5,117,960 | A * | 6/1992 | Ahls | B66B 23/04 |
| | | | | 198/335 |
| 5,133,443 | A | 7/1992 | Johnson et al. | |
| 5,307,920 | A | 5/1994 | Meyer et al. | |
| 5,372,232 | A * | 12/1994 | Ahls | B66B 23/04 |
| | | | | 198/335 |
| 5,638,937 | A | 6/1997 | Bimey et al. | |
| 5,881,859 | A * | 3/1999 | Bianchi | B66B 23/04 |
| | | | | 198/335 |
| 7,954,619 | B2 * | 6/2011 | Nurnberg | B66B 23/04 |
| | | | | 198/322 |
| 8,931,615 | B2 * | 1/2015 | Ye | B66B 23/145 |
| | | | | 198/335 |
| 9,745,173 | B2 * | 8/2017 | Boros | B66B 23/04 |
| 2008/0296125 | A1 | 12/2008 | Nurnberg et al. | |

FOREIGN PATENT DOCUMENTS

| | | |
|---|---|---|
| JP | H10175790 A | 6/1998 |
| JP | 2009149411 A | 7/2009 |

\* cited by examiner

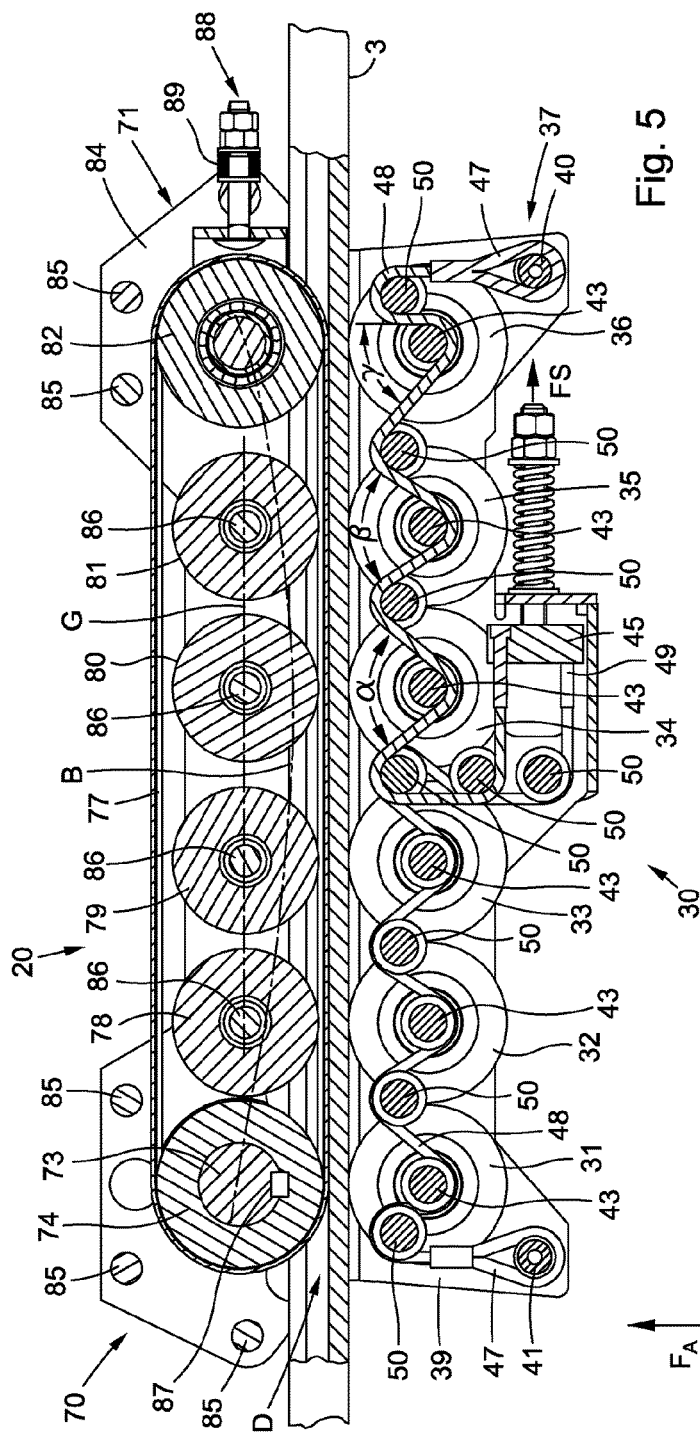

HANDRAIL DRIVE FOR AN ESCALATOR OR A MOVING WALKWAY

FIELD

The invention relates to a person transporting device which is designed as an escalator or moving walkway and a handrail drive for such a person transporting device.

BACKGROUND

A handrail drive for an escalator is disclosed in U.S. Pat. No. 5,307,920 A. The known handrail drive has a drive device and a counterpressure device. A handrail is guided between the drive device and the counterpressure device, wherein counterpressure rollers of the counterpressure device face the upper face of the handrail. The upper face is denoted as that side of the handrail onto which the users of the person transporting device place their hand in order to hold onto the handrail. Additionally, the drive device comprises supporting rollers which are assigned to a part of the counterpressure rollers, wherein a drive belt runs between the supporting rollers of the drive device and the handrail. The drive belt is also guided around a drive wheel and a tensioning wheel, in order to tension the drive belt. During operation, the counterpressure rollers press the handrail against the driven drive belt, wherein the drive belt is supported by the supporting rollers of the drive device. The pressing force with which the counterpressure rollers act on the handrail is applied by a spring of the counterpressure device.

The handrail drive disclosed in U.S. Pat. No. 5,307,920 A has the drawback that a large overall height is produced, since the counterpressure rollers are initially mounted in a seesaw arrangement, arranged remotely from the upper face of the handrail. This seesaw arrangement is acted upon by the spring of the counterpressure device which is even further away from the upper face of the handrail. Since such handrail drives are generally arranged in the balustrade base, due to their overall height they have to be arranged at the side of the step belt. This inevitably leads to a wider escalator construction. The operators of an escalator or a moving walkway, however, in the case of a predetermined installation width due to the dimensions of the building, desire a step belt or pallet belt which is as wide as possible in order to achieve a conveying power of the person transporting device which is as high as possible and to increase the travelling comfort for the users. Moreover, a handrail drive which is arranged at the side of the step belt may also result in deeper cavities on the structure side, so that the handrail drive, in particular the spring of the handrail drive, has sufficient space.

A further handrail drive for an escalator is disclosed in US 2008/0296125 A1. This handrail drive also has a drive device and a counterpressure device. The counterpressure device contains a loading device and a series of counterpressure rollers, wherein in the operational state, the handrail is arranged between the drive device and the counterpressure device, and thus is able to be guided between the drive device and the counterpressure device. In the operational state the handrail is acted upon by the series of counterpressure rollers against the drive device with a pressing force which is produced by the preloading force of the loading device. In order to achieve an overall height of the handrail drive which is as low as possible, at least one flexible pulling means is arranged between the counterpressure rollers and the loading device, by means of which flexible pulling means the counterpressure rollers are held in position and the preloading force of the loading device may be transmitted to the counterpressure rollers. To this end, the flexible pulling means and/or cable is wound in a meandering manner between deflection rollers and the axles of the counterpressure rollers. By the transmission of the tensioning force by means of a cable, each counterpressure roller is pressed by the same force against the handrail and thus against the drive device. By the deflection rollers being closely adjacent to one another and the arrangement thereof in the vicinity of the axles of the counterpressure rollers, no guides are provided for guiding the axles of the counterpressure rollers within the counterpressure device. It has been proven that the slip behavior of such linear handrail drives does not reduce proportionally relative to the number of counterpressure rollers thereof which are present. Moreover, handrails which are driven by linear handrail drives are generally subjected to greater wear than those which bear against a drive wheel in an arcuate manner, as is disclosed, for example, in U.S. Pat. No. 5,638,937 A.

SUMMARY

It is the object of the invention to specify a handrail drive for driving a handrail of a person transporting device which is implemented in a linear manner, which has improved slip behavior and which protects the handrail.

This object is achieved by a handrail drive having at least one drive device and at least one counterpressure device. The counterpressure device contains at least two counterpressure rollers, wherein the handrail of a person transporting device is able to be guided between the drive device and the counterpressure device. The at least two counterpressure rollers are able to load the handrail against the drive device by means of a pressing force. Each of the counterpressure rollers has a roller axle on which it is rotatably mounted. Additionally, the handrail drive contains at least one flexible pulling means which serves for transmitting the preloading force of a loading device of the handrail drive to the roller axle. To this end, the pulling means is connected to the roller axle by at least one partial looping. The transmission ratio of the pressing force of the respective counterpressure roller acting on the handrail to the preloading force of the loading device is able to be predetermined by an associated complementary angle of contact of the looping of the flexible pulling means. Moreover, the angles of contact on the roller axles of at least two counterpressure rollers differ from one another.

As a result, an ideal contact profile of the counterpressure device may be produced over the entire series of adjacently arranged counterpressure rollers so that, viewed over the series, the pressing force is different from one counterpressure roller to another counterpressure roller. An ideal contact profile significantly reduces the slip between the handrail to be driven and the drive device, since just enough contact is made at each contact point, so that at this contact point the static friction between the drive device and the handrail is not overcome. Moreover, the handrail is not flattened by pressing forces which are too high.

When fixing the different pressing forces, on the one hand, consideration has to be taken of the running direction of the handrail in the handrail drive. If the handrail is to be driven in both possible directions of movement, for example, a symmetrical contact profile is appropriate. Also, the material properties of the handrail and the counterpressure rollers have to be taken into account. An ideal dimensioning of the individual angle of contact is achieved when, at each point where a counterpressure roller presses the handrail against the drive device, the limit for the transition from static friction to sliding friction between the handrail and the drive device is not exceeded. Naturally, as an upper limit the permitted surface pressure of the weakest material should also not be exceeded. The limit for the transition from static friction to sliding friction at the individual points and/or contact points also depends on the resilience of the handrail in the longitudinal direction. With the same pressing forces at all points it is possible to overcome the static friction at individual contact points by the resilience of the handrail, so that here slip is temporarily produced and the handrail is subjected to excessive wear. This temporary slip may alternately occur at a plurality of contact points and is not necessarily limited to one contact point.

The counterpressure device preferably comprises linear guides which are configured for the linear guidance of the at least two counterpressure rollers. The assigned counterpressure roller may be guided by the linear guide at an angle relative to the longitudinal extent and/or central longitudinal axis of the handrail in a linear manner. Significant for the spatial position of the central longitudinal axis in each case is the point of contact between the assigned counterpressure roller and the handrail. If, for example, the handrail is deflected in the region of the counterpressure roller, the spatial position of the central longitudinal axis then serves at the point of contact in the manner of a tangent as a basis for the angled arrangement of the linear guide. Due to this linear guide, the assigned counterpressure roller may only move in the direction predetermined by the linear guide. This has the advantage that the point of contact of the handrail and counterpressure roller may be accurately predetermined, irrespective of the unevenness of the handrail travelling between the drive device and the counterpressure roller.

As a result, the present invention also eliminates the main drawbacks of the handrail drives disclosed in U.S. Pat. No. 5,307,920 A and US 2008/0296125 A1. The counterpressure rollers of U.S. Pat. No. 5,307,920 A which are mounted by a seesaw arrangement move on circular paths and are mutually supported on the handrail. As soon as a deflection of the seesaw arrangement takes place, for example, by dirt adhering to the handrail, the deflected counterpressure rollers influence the pressing force of the other counterpressure rollers. This may lead to a temporary loss of static friction between the handrail and the drive belt and as a result to undesirable slip. The axles of US 2008/0296125 A1, which are solely held by the pulling means tightly against the deflection rollers, may be displaced to a limited extent horizontally due to the flexibility of the spring element, since a linear guide of the axles is absent, whereby the same effect may be produced.

Preferably, the linear guide is arranged at right angles to the central longitudinal axis of the handrail and/or, when the handrail passes through the handrail drive in the linear direction, to the longitudinal extent of the handrail. This has the advantage that the pressing force is exclusively predetermined by the preloading force of the loading device. During operation of the handrail drive by the drive device on the counterpressure roller, as soon as the linear guide is not arranged at right angles to the central longitudinal axis of the handrail, a force vector is produced which, depending on the running direction, increases or reduces the pressing force of the counterpressure roller.

Ideally, the roller axles of all of the counterpressure rollers are guided in a linear manner by the linear guides described above. Preferably, the same flexible pulling means is partially looped around all of the roller axles of a counterpressure device, so that the required number of pulling means may be kept as low as possible.

Preferably, the roller axle protrudes over the counterpressure roller on both sides with its two ends. This provides the possibility that in the mounted state each of the two ends of the roller axle may be connected in a simple manner to at least one flexible pulling means, in order to transmit the preloading force preferably symmetrically to both ends of the roller axle.

Naturally, the counterpressure roller of a roller axle may also be subdivided into two narrow counterpressure rollers so that the at least one flexible pulling means may be arranged between the two narrow counterpressure rollers and may be connected to the roller axle.

Moreover, this embodiment provides the possibility that each of the two ends of the roller axle is guided by means of an associated linear guide of the counterpressure device. The linear guides may be configured such that they guide the assigned roller axle only in one plane in a linear manner. As a result, for example, oscillating compensating movements of the counterpressure roller transversely to the travelling direction and/or the direction of movement of the handrail are possible.

So that the loading device may be arranged at a suitable point, i.e. in particular permitting a minimum overall height of the counterpressure device, the counterpressure device preferably has at least one deflection device for deflecting the at least one flexible pulling means. Naturally, the counterpressure device may also comprise a plurality of deflection devices which deflect the flexible [pulling means] at a plurality of points of the counterpressure device. The deflection devices may comprise, for example, deflection rollers with rolling bearings or plain bearings. As a result, with a plurality of deflections, the preloading force transmitted by the pulling means is only slightly reduced for each deflection. Naturally, the counterpressure device may also comprise a plurality of flexible pulling means which are deflected by means of a plurality of deflection devices.

In order to keep the overall height of the handrail drive as low as possible, the handrail is preferably guided between the drive device and the counterpressure device in a travel zone in the linear running direction. Naturally, the drive device and the counterpressure device may also be designed such that the handrail is guided between the drive device and the counterpressure device in an arcuate running direction and thus is deflected in the travel zone.

For fastening the loading device, the counterpressure device may comprise at least one spring receiver. As a loading element, the loading device may comprise, for example, a helical compression spring, a disc spring unit, a gas compression spring, a block of resilient material, such as for example rubber and the like. The loading device and/or the central longitudinal axis of the loading element may be arranged by means of the spring receiver at a predetermined angle to the linear running direction of the handrail. For example, the central longitudinal axis of the loading element may be arranged parallel to the central longitudinal axis of the handrail.

Moreover, the counterpressure device may comprise a guide frame which is rigidly connected to a housing of the drive device. Preferably, the linear guides, the at least one deflection device and the at least one spring receiver are configured and/or arranged on this guide frame.

The drive device of the present handrail drive comprises at least one drive wheel, at least one tensioning wheel, at least one drive belt and one or more supporting rollers. The drive belt is arranged so as to circulate by means of the drive wheel and the tensioning wheel arranged spaced apart therefrom. The supporting rollers are arranged between the drive wheel and the tensioning wheel and support at least one side and/or at least one strand of the drive belt. The drive belt is driven by the drive wheel. The drive belt may be a toothed belt, a flat belt, a V-rib belt, a V-belt and the like. The drive wheel, the tensioning wheel and the supporting rollers are designed to be adapted to the drive belt.

Since the drive device described above extends over a certain length of the handrail, the counterpressure device may also be designed at a comparable length. In order to produce a sufficient counterpressure over the length of the drive device and/or a contact profile extending over the length of the counterpressure device, the counterpressure device, as mentioned above, has a plurality of counterpressure rollers. Preferably, the counterpressure rollers of the counterpressure device and the drive wheel, the tensioning wheel, and the supporting rollers of the drive device are in each case assigned in pairs to one another.

A particularly simple construction of the counterpressure device may be achieved when the at least one flexible pulling means is arranged in a meandering manner between the counterpressure rollers and/or the roller axles thereof and a plurality of deflection devices. Depending on the design of the counterpressure rollers, the deflection devices and optionally the loading device, only one flexible pulling means is required. Naturally, two or more flexible pulling means may also be used. For example, one of the flexible pulling means may be arranged in a meandering manner between all of the left-hand ends of the roller axles and the assigned deflection devices and the other flexible pulling means may be arranged in a meandering manner between all of the right-hand ends of the roller axles and the assigned deflection devices. Moreover, the counterpressure rollers may also be divided into groups, wherein the individual groups are acted upon by in each case one or two flexible pulling means.

The at least one flexible pulling means may be a steel cable, a glass fiber cable, a carbon fiber cable, an aramid fiber cable, a textile fiber cable with low elongation, a belt or a chain. Preferably, under pretension the flexible pulling means has an elongation over time which is as low as possible so that during operation this results in a loss of preloading force which is as low as possible. Due to this design for each counterpressure roller an extremely accurately predefined pressing force may be set.

However, it is also possible that the flexible pulling means is configured to be resilient so that the loading device only has means for setting the preloading force and no separate spring element. When using a resiliently flexible pulling means, however, care has to be taken that the setting behavior thereof is as low as possible in order to keep the loss of preloading force as low as possible.

Naturally, the handrail drive may have a monitoring device for monitoring the preloading force. This monitoring device may, for example, be a sensor which is arranged in the region of the loading device and monitors the position of the loading element described above.

The handrail drive according to the invention is preferably used in person transporting devices which are designed as an escalator or a moving walkway and comprise at least one movable handrail.

The person transporting device may naturally also have a plurality of handrail drives for each handrail to be driven. Naturally, existing person transporting devices may also be updated, by at least one existing handrail drive thereof being replaced by at least one handrail drive according to the invention having at least one flexible loading element. If required, further alterations are necessary to the existing person transporting device, for example, to the supporting frame and/or chassis, to guides of the handrail, to electrical systems and the like.

DESCRIPTION OF THE DRAWINGS

Preferred embodiments of the invention are described in more detail in the following description with reference to the accompanying drawings, in which corresponding elements are provided with the same reference numerals. In the drawings:

FIG. 5: shows a view of the longitudinal section Y-Y of the handrail drive specified in FIG. 4; and FIG. 6: shows a contact profile and/or the pressing forces acting on the handrail of the individual counterpressure rollers of the handrail drive shown in FIG. 5.

DETAILED DESCRIPTION

Figure 1:
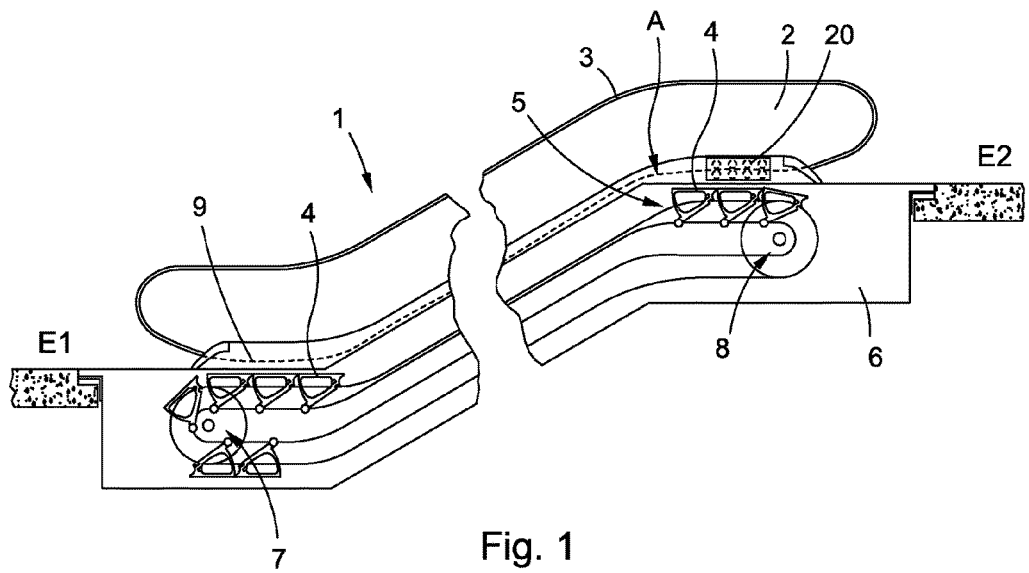
FIG. 1: shows in a schematic view an escalator with a supporting structure and/or chassis and two deflection regions, wherein balustrades with a circulating handrail are arranged on the supporting structure, said handrail being able to be driven by a handrail drive.

FIG. 1 shows schematically in side view a person transporting device 1 which is designed as an escalator 1 and which connects a first floor E1 to a second floor E2. The escalator 1 has a supporting structure 6 and/or a chassis 6 with two deflection regions 7, 8, a step belt 5 with a plurality of steps 4 being guided in a circulating manner therebetween. A handrail 3 is arranged in a circulating manner on a balustrade 2. The balustrade 2 is connected at the lower end by means of a balustrade base 9 to the supporting structure 6 and/or chassis 6. The path of the handrail 3 runs along the upper edge of the balustrade 2 and the return of the handrail 3 takes place inside the balustrade base 9. In order to drive the circulating handrail 3, a handrail drive 20 is arranged in the interior of the balustrade base 9.

Due to its low overall height, the handrail drive 20 is fixed to an upper chord of the supporting structure 6. Generally, an escalator 1 has two balustrades 2 each with one respective handrail 3, wherein the step belt 5 is arranged between the two balustrades 2. Accordingly, two handrail drives 20 are also generally required in order to drive the two circulating handrails 3.

Figure 2:
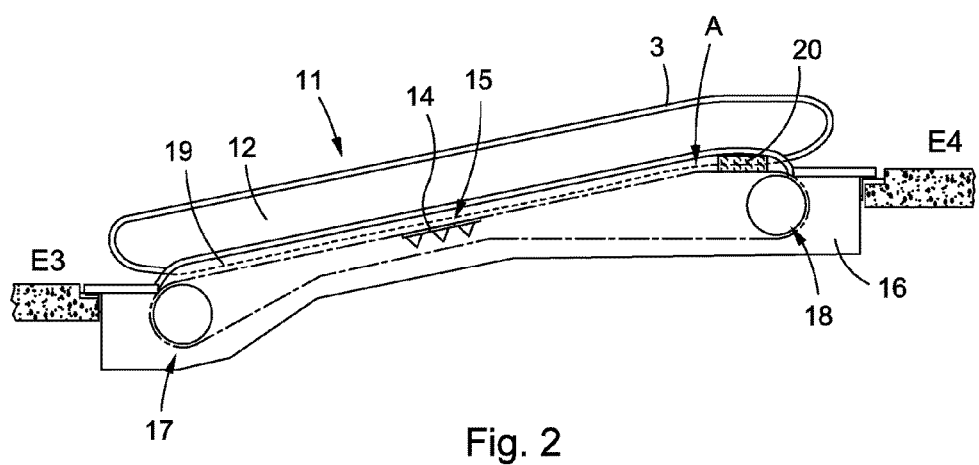
FIG. 2: shows in a schematic view a moving walkway with a supporting structure and two deflection regions, wherein balustrades with a circulating handrail are arranged on the supporting structure, said handrail being able to be driven by a handrail drive.

Constructed in a similar manner, FIG. 2 shows schematically in side view a person transporting device 11 designed as a moving walkway 11, which also has a balustrade 12 with a balustrade base 19, a handrail 3, a supporting structure 16 and two deflection regions 17, 18. In contrast to the escalator 1 of FIG. 1, a step belt is not arranged between the deflection regions 17, 18 of the moving walkway 11 but a pallet belt 15 circulating with a plurality of pallets 14. The moving walkway 11 connects, for example, a third floor E3 to a fourth floor E4. The handrail 3 and the handrail drive 20 of the moving walkway 11 correspond to the handrail 3 and the handrail drive 20 of the escalator 1 of FIG. 1 which is why the same reference numerals are used. Also, generally two balustrades 12 with handrails 3 are used in a moving walkway 11, said balustrades extending on both sides of the pallet belt 15.

As both FIGS. 1 and 2 show, the handrail drives 20 are built into a portion of the escalator 1 or the moving walkway 11 in which the handrail 3 to be driven is guided in a linear direction in the balustrade base 9, 19. Naturally a handrail drive 20 may also be arranged in a region in which the handrail 3 is deflected as, for example, takes place in the region denoted by A. Then, however, the travel zone D (see FIGS. 3 to 5) of the handrail drive 20 which the handrail 3 passes through would also have to be designed to be arcuate. Such a design of the handrail drive 20, however, is able to be implemented in a simple manner as is clearly visible from the following FIGS. 3 to 5 described together.

Figure 3:
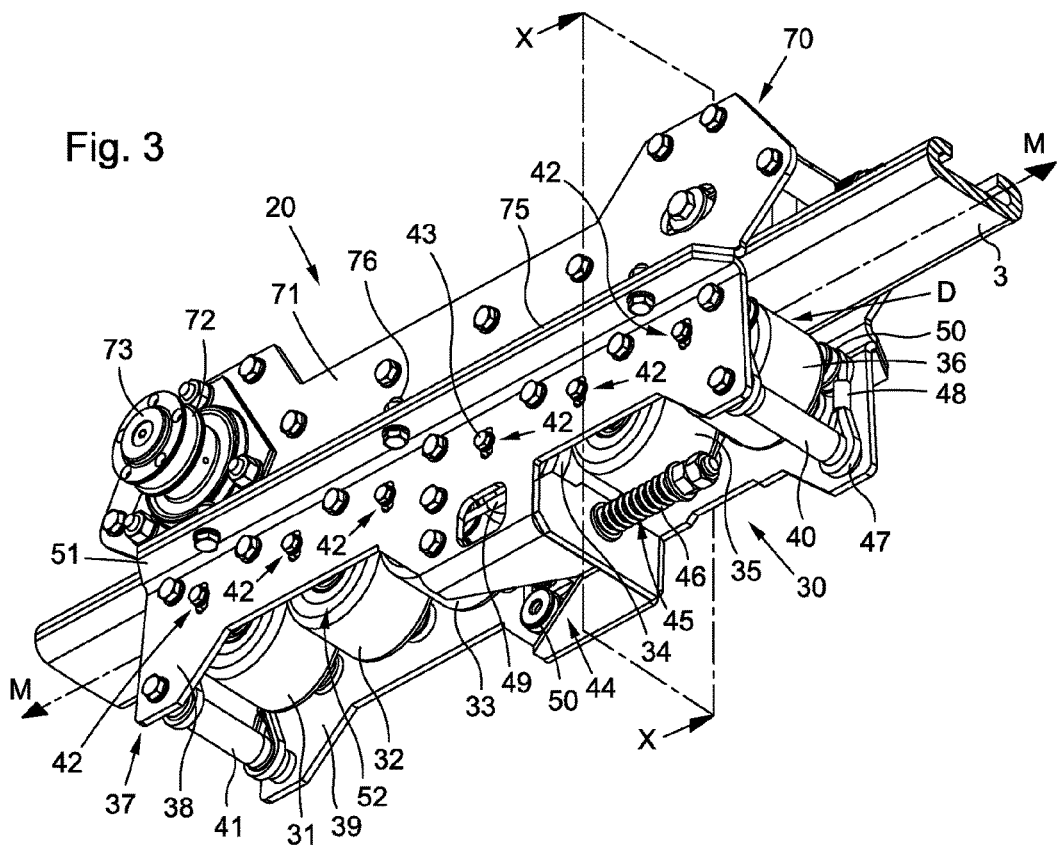
FIG. 3: shows the handrail drive shown in FIGS. 1 and 2 and a portion of the handrail in a three-dimensional view.

FIG. 3 shows the handrail drive 20 of FIGS. 1 and 2 and a part of the handrail 3 in a three-dimensional view. The handrail drive 20 is shown in its installed position provided in the person transporting unit 1, 11 wherein the viewing direction from obliquely below is selected in order to show as many parts as possible of the counterpressure device 30 of the handrail drive 20.

Figure 4:
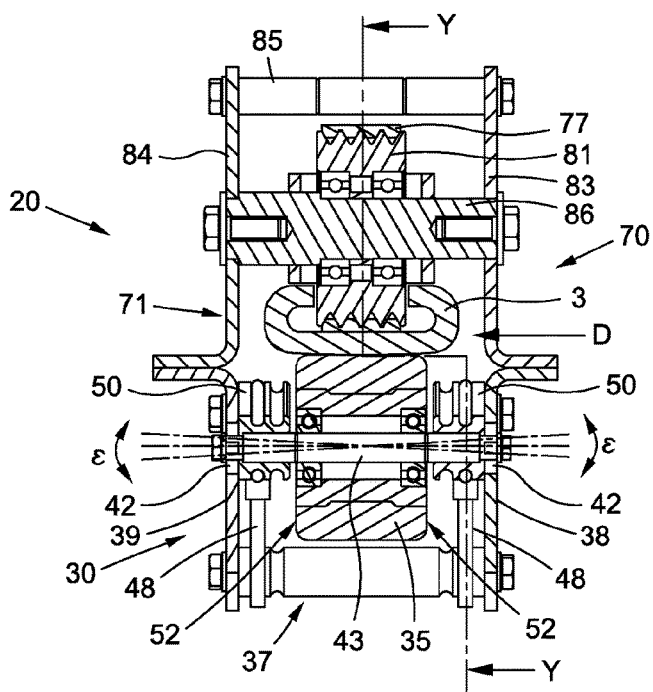
FIG. 4: shows a view of the cross section X-X of the handrail drive specified in FIG. 3.

FIG. 4 shows the cross section X-X of the handrail drive 20 in the region of the counterpressure roller 35 specified in FIG. 3. FIG. 5 shows the longitudinal section Y-Y of the handrail drive 20 specified in FIG. 4.

The handrail drive 20 may be produced and sold independently of the other components of the person transporting device 1, 11. The counterpressure device 30 has a plurality of counterpressure rollers 31 to 36. Each of the counterpressure rollers 31 to 36 has a roller axle 43 (only one provided with reference numerals). The roller axles 43 of the counterpressure rollers 31 to 36 are all arranged in a plane parallel to the central longitudinal axis M-M of the handrail 3 and adjacent to one another in a guide frame 37 of the counterpressure device 30.

The guide frame 37 has two cheeks 38, 39 which are configured mirror-symmetrically to the central longitudinal axis M-M of the handrail 3 and which are connected together by means of two spacer bolts 40, 41. Linear guides 42 which are configured as slots are present in the two cheeks 38, 39, wherein due to the perspective view only the linear guides 42 of one of the two cheeks 38, 39 may be seen.

The ends of each roller axle 43 extend through two linear guides 42 and/or slots 42 of the guide frame 37 opposing one another, so that the counterpressure rollers 31 to 36 are guided by means of the linear guides 42 in a linear manner. In the exemplary embodiment shown, the linear guides 42 and/or slots 42 extend to their greatest extent at right angles to the central longitudinal axis M-M.

The central longitudinal axis M-M also denotes the longitudinal extent and the linear running direction of the handrail 3 in the travel zone D and/or conveying zone D of the handrail drive 20. However, it is also possible to select an angled arrangement of the linear guides 42, deviating from a right angle relative to the central longitudinal axis M-M of the handrail 3. Logically, the linear guide 42 should be not arranged parallel to the central longitudinal axis M-M.

Additionally a spring receiver 44 is configured on the guide frame 37 of the counterpressure device 30, through which spring receiver 44 a loading device 45 is able to be arranged at a predetermined angle to the linear running direction and/or to the central longitudinal axis M-M of the handrail 3. In the present exemplary embodiment, the loading device 45 has a helical compression spring as a loading element 46. Naturally, also a gas compression spring, a disc spring unit, a block of resilient material, such as for example rubber and the like, may be used as a loading element 46. In the present exemplary embodiment, the loading device 45 and/or the central longitudinal axis of the loading element 46 thereof are arranged parallel to the running direction of the handrail 3.

Additionally it may be seen that the first ends 47 of the flexible pulling means 48 are fastened to the spacer bolts 40, 41. The second ends 49 thereof are connected to the loading device 45. The flexible pulling means 48 are mainly arranged between the cheeks 38, 39 and the front faces 52 of the counterpressure rollers 31 to 36 and are partially looped around the roller axles 43 of the counterpressure rollers 31 to 36 and deflection devices 50 fastened to the cheeks 38, 39. The arrangement of the flexible pulling means 48 is described in more detail below in connection with FIGS. 4 and 5.

Naturally, further possibilities for arranging the flexible pulling means 48 in the counterpressure device 30 are conceivable. For example, the counterpressure rollers 31 to 36 in each case may be divided into two narrow counterpressure rollers, arranged spaced apart from one another on their assigned roller axles 43. By the intermediate space thus produced, which makes the center of the roller axle 43 accessible, the flexible pulling means 48 may be arranged between the two narrow counterpressure rollers and connected to the roller axle 43.

The handrail drive 20 further comprises a drive unit 70, the housing 71 and a drive belt disk 72 thereof being substantially visible. The drive belt disc 72 may be connected to a motor, not shown. The drive torque transmitted from the motor to the drive belt disk 72 is transmitted by means of a shaft 73 to a drive wheel 74 shown in FIG. 5.

Connecting lugs 51, 75 are configured both on the housing 71 of the drive unit 70 and on the guide frame 37 of the counterpressure device 30, the drive unit 70 being able to be connected thereby to the counterpressure device 30 by means of a few screws 76. This significantly facilitates the replacement of the handrail 3 in the case of maintenance, since the counterpressure device 30 may be easily detached from the drive unit 70, the old handrail 3 removed from the travel zone D, the new handrail 3 inserted into the travel zone D and the counterpressure device 30 again tightly screwed to the drive unit 70. Instead of the screws 76, naturally other fastening means may also be used.

The cross section X-X of the counterpressure device shown in FIG. 4 shows a further outstanding advantage of the present handrail drive 20. Since the two ends of the roller axles 43 of the counterpressure rollers 31 to 36 on both sides are guided in a linear manner by means of linear guides 42 in the guide frame 37, said ends of the roller axles may oscillate and/or pivot due to the low clearance in the linear guides 42 transversely to the central longitudinal axis M-M (see FIG. 3), as is illustrated in FIG. 4 by the stated angle ε-ε. As a result, the counterpressure rollers 31 to 36 follow every unevenness and/or every difference in thickness of the handrail 3, whereby said handrail does not flex and dirt adhering to the handrail 3 is rolled in to a lesser degree. This has the result that the handrail 3 may be cleaned more easily and the service life thereof is increased.

In the cross section X-X of the counterpressure device 30 the arrangement of the flexible pulling means 48 between the cheeks 38, 39 and the front faces 52 of the counterpressure rollers 31 to 36 is also visible. The deflection devices 50 arranged on the cheeks 38, 39 protrude only sufficiently far into this intermediate space that they do not come into contact with the front faces 52 of the counterpressure rollers 31 to 36.

In FIGS. 4 and 5, further parts of the drive unit 70 are also visible. In the housing 71, as shown in FIG. 5, a drive wheel 74 and a tensioning wheel 82 are arranged, a drive belt 77 being arranged thereon in a circulating manner. The drive wheel 74 is rotatably mounted by means of the shaft 73, wherein by means of a wedge 87 the torque of the shaft 73 is positively transmitted to the drive wheel 74. The tensioning wheel 82 is connected to a belt loading device 88, which in the present exemplary embodiment has a disc spring unit as a loading element 89. Naturally in the belt loading device 88 other loading elements 89, such as helical compression springs, tension springs, gas compression springs and the like may also be used.

Moreover, a plurality of supporting rollers 78 to 81 which support the drive belt 77 are arranged in the housing 71. In FIG. 4, due to the cutting plane X-X, only one supporting roller 81 is shown. In the present exemplary embodiment a V-rib belt 77 and/or poly V-belt 77 is used as the drive belt 77.

Additionally, the simple and stable construction of the housing 71 of the drive unit 70 by means of two housing cheeks 83, 84 and spacer bolts 85 is visible. The housing 71 is additionally reinforced by the mounted supporting roller axles 86 of the supporting rollers 78 to 81, since these supporting roller axles 86 are fixedly connected to the housing cheeks 83, 84. The supporting rollers 78 to 81 support the drive belt 77 and the part of the handrail 3 located in the travel zone D against the pressing forces $F_1$ to $F_6$ of the counterpressure rollers 31 to 36 shown in FIG. 6. FIG. 6 is described in more detail below.

The present exemplary embodiment shown in FIGS. 3 to 5 of the handrail drive 20 has a linear travel zone D, i.e. the handrail 3 is not deflected in this travel zone D. As already mentioned above, however, the travel zone D does not necessarily have to be linear. An arcuate travel zone D and thus a deflection of the handrail 3 is achievable in a very simple manner by the rotational axes 86 of the supporting rollers 78 to 81 between the drive wheel 74 and the tensioning wheel 82 not being arranged on a straight line G and/or plane but on an arcuate line B in the housing 71 of the drive unit 70. If required, the local position of the individual linear guides 42 of the counterpressure rollers 31 to 36 also have to be accordingly adapted.

As already described in connection with FIG. 3, the first ends 47 of flexible pulling means 48 are fastened to the spacer bolts 40, 41. The second ends 49 thereof are connected to the loading device 45. In the present exemplary embodiment, a total of four flexible pulling means 48 (only two visible in FIG. 5) are present, wherein in each case two flexible pulling means 48 are assigned to a first group of counterpressure rollers 31 to 33 and to a second group of counterpressure rollers 34 to 36. By the four flexible pulling means 48, the preloading force FS of the loading device 45 is transmitted to the counterpressure rollers 31 to 36. Naturally, with a corresponding design, the preloading force FS may also be transmitted to all counterpressure rollers 31 to 36 by means of a single flexible pulling means 48. It is also possible that one or two flexible pulling means 48 are assigned to each counterpressure roller 31 to 36.

The flexible pulling means 48 are arranged in a meandering manner between the first group of counterpressure rollers 31 to 33 and/or the roller axles thereof 43 and the second group of counterpressure rollers 34 to 36 and/or the roller axles thereof 43 and a plurality of deflection devices 50. In this case, the flexible pulling means 48 are partially looped around the roller axles 43 of the counterpressure rollers 31 to 36 and the deflection devices 50. Depending on the positioning of the deflection devices on the cheeks 38, 39 of the guide frame 37, different complementary angles of contact α, β, γ may be produced for the individual roller axles 43. The angle between the two portions of pulling means 48 of the flexible pulling means which lead away from the roller axle 43, around which the flexible pulling means is looped, is denoted as the complementary angle of contact α, β, γ. As may be clearly derived from FIG. 5, the three denoted complementary angles of contact α, β, γ of the counterpressure rollers 34 to 36 differ from one another. By means of these complementary angles of contact α, β, γ a transmission ratio may be fixed for each of the counterpressure rollers 34 to 36, by means of which the preloading force FS is transmitted into a pressing force $F_A$ acting on the handrail 3 from the associated counterpressure roller 34 to 36.

In order to show this even more clearly, FIG. 6 shows a contact profile, the reference numerals of the individual counterpressure rollers 31 to 36 being plotted on the abscissa $F_N$ thereof. The pressing forces $F_A$ of the individual counterpressure rollers 34 to 36 of the handrail drive 20 acting on the handrail 3 shown in FIG. 5 are plotted schematically on the ordinate thereof. In order to be able to assign the pressing forces $F_A$ to the individual counterpressure rollers 31 to 36, said forces are denoted in FIG. 6 as specific pressing forces $F_1$ to $F_6$.

In the exemplary embodiment shown of FIGS. 3 to 6 the greatest complementary angle of contact α of the counterpressure roller 34 produces the smallest transmission ratio in order to transmit the preloading force FS into the pressing force $F_4$. Accordingly, the smallest complementary angle of contact γ of the counterpressure roller 36 produces the greatest transmission ratio in order to transmit the preloading force FS into the pressing force $F_6$. As a result, an ideal contact profile of the counterpressure device 30 may be fixed and/or produced over the entire series of adjacently arranged counterpressure rollers 31 to 36, so that, for example, the pressing force $F_A$ reduces toward the center of the series from one counterpressure roller to another counterpressure roller. Naturally, the pressing force $F_A$ may also increase toward the center of the series.

The specific pressing forces $F_1$ to $F_6$ shown schematically in FIG. 6 are naturally subjected to the frictional forces in the deflection devices 50 and the roller axles 43, around which the flexible pulling means are looped. Due to the present invention, however, these maybe considered together when dimensioning the different angles of contact α, β, γ.

Although the invention has been described by the illustration of specific exemplary embodiments, it is obvious that numerous further variants may be provided within the knowledge of the present invention, i.e. instead of a plurality of flexible pulling means 48 only one flexible pulling means 48 being used, for example, wherein the two ends thereof are fastened to the guide frame 37 and the center of this flexible pulling means 48 is connected to the loading device 45. The handrail drive 20 according to the invention may be used both in an escalator 1 and in a moving walkway 11. Additionally, a plurality of handrail drives 20 may be arranged in the balustrade base 9, 19 for driving each handrail 3 of the escalator 1 or the moving walkway 11. If the counterpressure device 30 has counterpressure rollers 31 to 36 arranged in an arcuate manner, it may also be combined with a drive device which has an individual large drive wheel, the handrail 3 to be driven being deflected on the circumference thereof.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A handrail drive having at least one drive device and at least one counterpressure device, which counterpressure device contains at least two counterpressure rollers, wherein a handrail of a person transporting device is guided between the drive device and the counterpressure device, and the at least two counterpressure rollers load the handrail against the drive device by applying a pressing force, wherein each of the counterpressure rollers has a roller axle and the handrail drive contains at least one flexible pulling means that is connected to the roller axle by at least one partial looping for transmitting a preloading force of a loading device of the handrail drive to the roller axle, comprising: a transmission ratio of the pressing force of the counterpressure roller acting on the handrail to the preloading force of the loading device is predetermined by a setting of a complementary angle of contact of the looping of the flexible pulling means and associated angles of contact of the at least two counterpressure rollers to be different from one another.

2. The handrail drive according to claim 1 wherein the counterpressure device includes linear guides, the at least two counterpressure rollers being guided by said linear guides at an angle relative to a longitudinal extent of the handrail or to a central longitudinal axis of the handrail.

3. The handrail drive according to claim 2 wherein the linear guides are arranged at right angles to the longitudinal extent of the handrail or to the central longitudinal axis of the handrail.

4. The handrail drive according to claim 1 wherein ends of the roller axle protrude from the counterpressure roller on both sides thereof and in a mounted state each of the ends of the roller axle is connected to at least one flexible pulling means.

5. The handrail drive according to claim 4 wherein each of the ends of the roller axle is guided by an associated linear guide of the counterpressure device.

6. The handrail drive according to claim 1 wherein the counterpressure device includes at least one deflection device for deflecting the at least one flexible pulling means.

7. The handrail drive according to claim 1 wherein the handrail is guided between the drive device and the counterpressure device in a travel zone in a linear running direction and the counterpressure device includes at least one spring receiver, the loading device being arranged by the spring receiver at a predetermined angle to the linear running direction.

8. The handrail drive according to claim 1 wherein the counterpressure device includes a guide frame that is rigidly connected to a housing of the drive device.

9. The handrail drive according to claim 1 wherein the drive device includes at least one drive wheel, at least one tensioning wheel, at least one drive belt and a plurality of supporting rollers, and the drive belt is driven by the drive wheel.

10. The handrail drive according to claim 9 wherein each of the counterpressure rollers of the counterpressure device is paired across the drive belt with one of the drive wheel, the tensioning wheel, and the supporting rollers.

11. The handrail drive according to claim 10 wherein the at least one flexible pulling means is arranged in a meandering manner between at least one of the counterpressure rollers and the roller axles thereof and a plurality of deflection devices.

12. The handrail drive according to claim 1 wherein the at least one flexible pulling means is a steel cable, a glass fiber cable, a carbon fiber cable, an aramid fiber cable, a textile fiber cable with low elongation, a belt or a chain.

13. A person transporting device, being an escalator or a moving walkway, comprising at least one movable handrail and at least one handrail drive according to claim 1 for driving the at least one handrail.

14. A method for updating an existing person transporting device comprising the step of replacing at least one existing handrail drive of the person transporting device with at least one handrail drive, the at least one handrail drive having at least one drive device and at least one counterpressure device, which counterpressure device contains at least two counterpressure rollers, wherein a handrail of a person transporting device is guided between the drive device and the counterpressure device, and the at least two counterpressure rollers load the handrail against the drive device by applying a pressing force, wherein each of the counterpressure rollers has a roller axle and the handrail drive contains at least one flexible pulling means that is connected to the roller axle by at least one partial looping for transmitting a preloading force of a loading device of the handrail drive to the roller axle, comprising: a transmission ratio of the pressing force of the counterpressure roller acting on the handrail to the preloading force of the loading device is predetermined by a setting of a complementary angle of contact of the looping of the flexible pulling means and associated angles of contact of the at least two counterpressure rollers to be different from one another.

* * * * *